United States Patent
Kawaguchi (10) Patent No.: US 8,909,896 B2
(45) Date of Patent: Dec. 9, 2014

(54) NETWORK EFFICIENCY FOR CONTINUOUS REMOTE COPY

(75) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 417 days.

(21) Appl. No.: 13/037,759

(22) Filed: Mar. 1, 2011

(65) Prior Publication Data
US 2012/0226876 A1 Sep. 6, 2012

(51) Int. Cl.
- G06F 12/00 (2006.01)
- G06F 3/06 (2006.01)
- G06F 11/20 (2006.01)

(52) U.S. Cl.
CPC ............. *G06F 3/0604* (2013.01); *G06F 3/065* (2013.01); *G06F 3/0664* (2013.01); *G06F 3/067* (2013.01); *G06F 11/2056* (2013.01)
USPC ..... 711/202; 711/165; 711/154; 711/E12.002

(58) Field of Classification Search
None
See application file for complete search history.

(56) References Cited

U.S. PATENT DOCUMENTS

| | | | |
|---|---|---|---|
| 6,820,168 B2 | 11/2004 | Tanaka et al. | |
| 7,152,079 B2 | 12/2006 | Hirakawa et al. | |
| 2003/0225801 A1 | 12/2003 | Devarakonda et al. | |
| 2006/0004820 A1 | 1/2006 | Claudatos et al. | |
| 2006/0212667 A1* | 9/2006 | Mikami | 711/162 |
| 2006/0236048 A1* | 10/2006 | Deguchi et al. | 711/162 |
| 2006/0277376 A1 | 12/2006 | Watanabe et al. | |
| 2008/0109630 A1* | 5/2008 | Watanabe et al. | 711/171 |
| 2009/0193207 A1* | 7/2009 | Ogata et al. | 711/162 |
| 2009/0248759 A1* | 10/2009 | Okada et al. | 707/204 |
| 2010/0274767 A1* | 10/2010 | Irisawa et al. | 707/654 |

FOREIGN PATENT DOCUMENTS

| | | |
|---|---|---|
| JP | 07-121310 A | 5/1995 |
| JP | 09-305324 A | 11/1997 |
| JP | 2006-163560 A | 6/2006 |

OTHER PUBLICATIONS

"Fibre Channel, Backbone-5 (FC-BB-5), Rev 2.00", Jun. 4, 2009, 180 pp, American National Standard of Accredited Standards Committee.
"Information Technology, Fibre Channel, Framing and Signaling—2, Amendment 1 (FC-FS-2/AM1), Rev 1.01", Dec. 4, 2006, 34 pp, American National Standard of Accredited Standards Committee.

(Continued)

*Primary Examiner* — Matthew Bradley
*Assistant Examiner* — Arvind Talukdar
(74) *Attorney, Agent, or Firm* — Mattingly & Malur, PC (57) ABSTRACT

A method for controlling data for a storage system comprises: receiving a write input/output (I/O) command of a data from a host computer, the write I/O command including an application ID identifying an application operating on the host computer which sends the write I/O request; maintaining a record of a relation between the application ID in the write I/O command and a storage location of the data to be written in a first volume of the storage system; determining, based on the application ID, whether a data transfer function between the first volume and a second storage volume is to be performed on the data beyond writing the data to the storage location in the first volume; and if the data transfer function is to be performed on the data, then performing the data transfer function on the data to the second volume.

20 Claims, 8 Drawing Sheets

(56) References Cited

OTHER PUBLICATIONS

"Internet Protocol, DARPA Internet Program, Protocol Specification", Sep. 1981, 49 pp, Information Sciences Institute, University of Southern California, Marina del Ray, California.

Postel, J., "Assigned Numbers", Sep. 1981, 15 pp, Information Sciences Institute, University of Southern California, Marina del Ray, California.

"Transmission Control Protocol, DARPA Internet Program, Protocol Specification", Sep. 1981, 88 pp, Information Sciences Institute, University of Southern California, Marina del Ray, California.

Satran et al., Internet Small Computer Systems Interlace (iSCSI), Apr. 2004, 240 pp, The Internet Society.

Evans, "Information technology—SCSI Block Commands—3 (SBC-3)", Working Draft Project American National Standard, T10/1799-D, Jan. 21, 2011, Revision 26, 282 pp, International Committee for Information Technology Standards.

* cited by examiner

FIG. 1

| Application ID | Remote Copy Status |
|---|---|
| 01:23:45:67:89:ab:cd:00 | Applied |
| 01:23:45:67:89:ab:cd:01 | Applied |
| 11:22:33:44:55:66:77:00 | Applied |
| 11:22:33:44:55:66:77:01(0) | Not applied |
| 11:22:33:44:55:66:77:01(1) | Applied |
| 11:22:33:44:55:66:77:02 | Not Applied |
| 11:22:33:44:55:66:77:03 | Applied |

FIG. 2

| LBA range | Application IDs |
|---|---|
| 0x0000-0x000f | 01:23:45:67:89:ab:cd:00, 01:23:45:67:89:ab:cd:01 |
| 0x0010-0x001f | 11:22:33:44:55:66:77:00 |
| 0x0020-0x002f | 11:22:33:44:55:66:77:00 |
| 0x0030-0x003f | 11:22:33:44:55:66:77:00, 11:22:33:44:55:66:77:01 |
| 0x0040-0x004f | 11:22:33:44:55:66:77:01(0) |
| 0x0050-0x005f | 11:22:33:44:55:66:77:01(0) |
| 0x0060-0x006f | 11:22:33:44:55:66:77:01(1) |
| 0x0070-0x007f | 11:22:33:44:55:66:77:01(1) |
| 0x0080-0x008f | 11:22:33:44:55:66:77:02 |
| 0x0090-0x009f | 11:22:33:44:55:66:77:02 |
| 0x00a0-0x00af | 11:22:33:44:55:66:77:02 |
| 0x00b0-0x00bf | 11:22:33:44:55:66:77:02 |
| 0x00c0-0x00cf | Empty |
| 0x00d0-0x00df | Empty |
| 0x00e0-0x00ef | 11:22:33:44:55:66:77:03 |
| 0x00f0-0x00ff | 11:22:33:44:55:66:77:03 |
| 0x0100-0x010f | 11:22:33:44:55:66:77:03 |
| 0x0110-0x011f | 11:22:33:44:55:66:77:03 |
| 0x0120-0x012f | 11:22:33:44:55:66:77:03 |
| 0x0130-0x013f | 11:22:33:44:55:66:77:03 |
| 0x0140-0x014f | 11:22:33:44:55:66:77:03 |

FIG. 8

NETWORK EFFICIENCY FOR CONTINUOUS REMOTE COPY

BACKGROUND OF THE INVENTION

The present invention relates generally to storage systems and, more particularly, to system and method for improving the efficiency of applying a data transfer function such as remote copy to a data beyond the initial write input/output (I/O) operation of that data.

According to recent trends, the remote copy technology is one of the important technologies to continue or preserve business activities against a large-scale disaster. The remote copy technologies are classified broadly into two kinds, namely, synchronous and asynchronous. The synchronous remote copy is used between multiple datacenters which are spaced apart by distances that are not short distances. The asynchronous remote copy is used between multiple datacenters which are spaced apart by longer distances than those in the synchronous remote copy. For example, U.S. Pat. No. 7,152,079 discloses data replication among storage systems and, more specifically, asynchronous remote copy.

Heretofore, remote copy technologies typically require wide broad band network to transfer data. The data transfer occurs on initial copy, failback operation, and mirroring for write I/Os. However, generally the cost of data transfer between datacenters is expensive. Thus, it is desirable to reduce the traffic of remote copy. Traditionally, a user selects the volumes to apply the remote copy function and the remote copy function is not applied to the volumes that are not selected. The user may have variable data in one volume, and many of the volumes do not require the user to apply the remote copy function.

BRIEF SUMMARY OF THE INVENTION

Exemplary embodiments of the invention provide system and method for selecting the data to apply a data transfer function such as a remote copy function beyond the initial write I/O operation of that data. Each application that works on the host computers has an ID (identifier). The storage system stores in memory the relation between the accessing ID of the application and the accessed area on a volume. In this way, the storage system can identify the alignment for initial copy to a remote storage. The storage system checks and finds, for each write I/O, the ID of the application. Based on the ID of the application for each write I/O, the storage system can select each write I/O which needs to mirror to the remote storage. Because the data transfer function is performed only for the selected data, the system achieves network efficiency. This approach is also convenient, especially in the virtual machine environment, where it is common to assign an independent WWPN (World Wide Port Name) and/or an IP address for the storage I/O to each virtual machine. In specific embodiments, the approach reduces the remote copy traffic between tow datacenters by finding, for each write I/O, the data which needs the application of further data transfer by checking the ID (WWPN or IP address), and it can reduce the remote copy traffic in the environment where multiple virtual machines share and store data in one volume.

An aspect of the present invention is directed to a method for controlling data for a storage system which is coupled via a network to one or more host computers. The method comprises: receiving a write input/output (I/O) command of a data from a host computer, the write I/O command including an application ID identifying an application operating on the host computer which sends the write I/O request; maintaining a record of a relation between the application ID in the write I/O command and a storage location of the data to be written in a first volume of the storage system; determining, based on the application ID, whether a data transfer function between the first volume and a second storage volume is to be performed on the data beyond writing the data to the storage location in the first volume; and if the data transfer function is to be performed on the data, then performing the data transfer function on the data to the second volume.

In some embodiments, the storage location is used to determine whether the data transfer function between the first volume and a second storage volume is to be performed. The data transfer function includes at least one of data copy the data, data mirroring of the data, data restoration of the data, and remote copy of the data. The application ID is one of WWPN (World Wide Port Name) of an initiator port for an initiator of the write I/O command or an IP address. The application ID is an ID of a virtual machine on the host computer issuing the write I/O command. Maintaining a record of the relation between the application ID in the write I/O command and a storage location of the data to be written in a volume of the storage system includes maintaining a data alignment table which shows relationship between storage location and corresponding application ID and maintaining an initiator filter table which shows relationship between application ID and data transfer status, the data transfer status indicating whether a data transfer function is to be applied for the application ID.

In specific embodiments, the method further comprises identifying, based on the write I/O command, the storage location of the data to be written in the first volume. The application ID is included in the SCSI command by the application operating on the host computer. After determining that the data transfer function is to be performed on the data to the second volume, performing the data transfer function comprises: setting initially a progress pointer at a top address of the first volume to which the data is to be written in the storage system; checking the maintained record of the relation to determine whether the progress pointer currently points to an address representing a storage location which has a corresponding application ID indicating the data transfer function is to be performed, and if yes, then performing the data transfer to the second volume on the data in an address range of the address to the progress pointer currently points; setting the progress pointer to a next address and repeating the checking until the progress pointer reaches a bottom address of the first volume. The method further comprises deciding whether the first volume of the storage system having the storage location of the data to be written uses the data transfer function or not; and performing the data transfer function on the data to the second volume only if the volume uses the data transfer function.

Another aspect of the invention is directed to a first storage system which is coupled via a network to a second storage system and to one or more host computers in an information system. The first storage system comprises a processor; a memory; an input/output (I/O) control module configured to receive a write I/O command of a data from a host computer, the write I/O command including an application ID identifying an application operating on the host computer which sends the write I/O request; maintain a record of a relation between the application ID in the write I/O command and a storage location of the data to be written in a volume of the first storage system; and determine, based on the application ID, whether a data transfer function to the second storage system is to be performed on the data beyond writing the data to the storage location in the volume of the first storage system; and a data transfer control module configured, if a data transfer function is to be performed on the data, to perform the data transfer function on the data to the second storage system.

Another aspect of this invention is directed to a computer-readable storage medium storing a plurality of instructions for controlling a data processor to manage data transfer for a first storage system which is coupled via a network to a second storage system and to one or more host computers. The plurality of instructions comprise: instructions that cause the data processor to receive a write input/output (I/O) command of a data from a host computer, the write I/O command including an application ID identifying an application operating on the host computer which sends the write I/O request; instructions that cause the data processor to maintain a record of a relation between the application ID in the write I/O command and a storage location of the data to be written in a volume of the first storage system; instructions that cause the data processor to determine, based on the application ID, whether a data transfer function to the second storage system is to be performed on the data beyond writing the data to the storage location in the volume of the first storage system; and instructions that cause the data processor, if a data transfer function is to be performed on the data, to perform the data transfer function on the data to the second storage system.

These and other features and advantages of the present invention will become apparent to those of ordinary skill in the art in view of the following detailed description of the specific embodiments.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for improving the efficiency of applying a data transfer function such as remote copy to a data beyond the initial write input/output (I/O) operation of that data.

Figure 1:
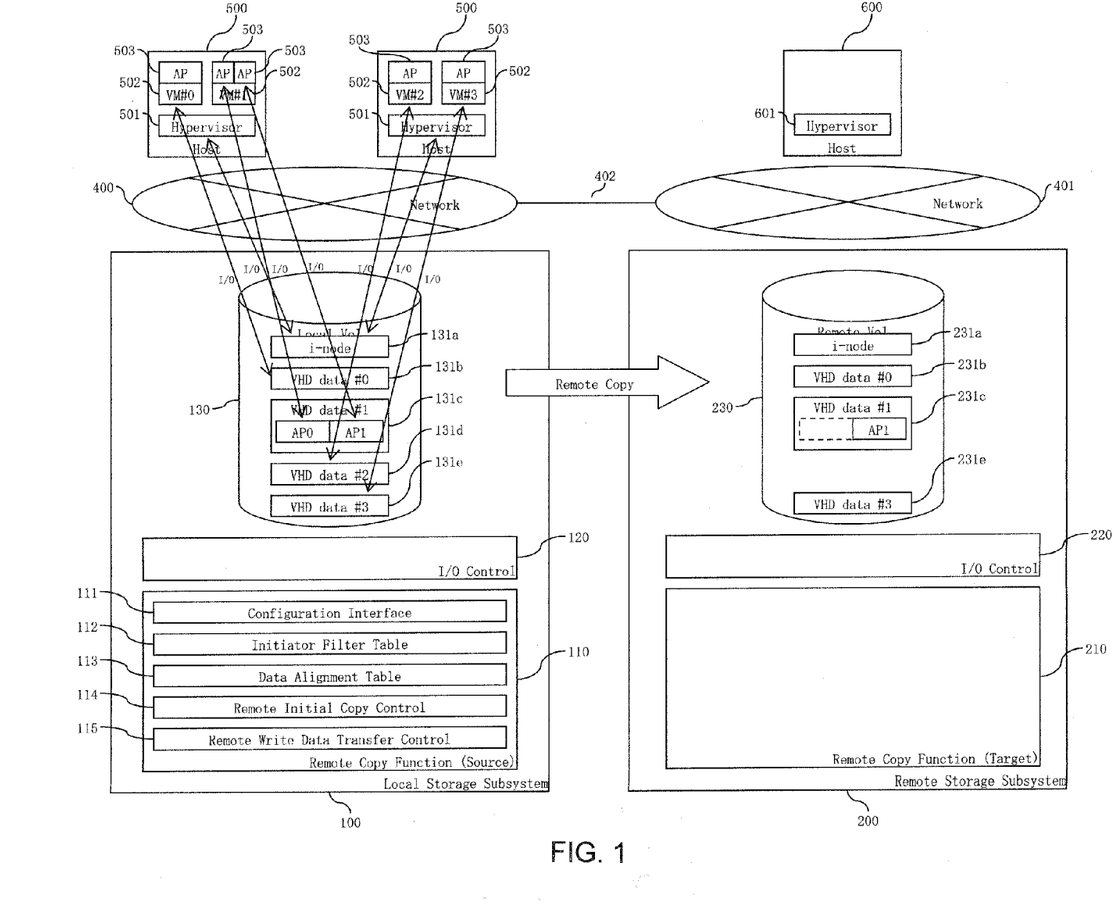
FIG. 1 illustrates an example of a hardware configuration of an information system in which the method and apparatus of the invention may be applied.

FIG. 1 illustrates an example of a hardware configuration of an information system in which the method and apparatus of the invention may be applied.

A local (first) storage subsystem 100 and a remote (second) storage subsystem 200 are connected via one or more networks 400, 402 and 401. The local storage subsystem 100 is connected to one or more host computers 500 via the network 400. The remote storage subsystem 200 is connected to a host computer 600 via the network 401. The networks 400, 401 and 402 may be FC (Fibre Channel), FCoE (Fibre Channel over Ethernet), or TCP/IP (transmission control protocol/internet protocol) networks. The storage subsystem 100 receives I/O commands from the host computers 500 and provides storage volumes 130 to the host computers 500. The storage subsystem 200 receives I/O commands from the host computer 600 and provides storage volumes 230 to the host computer 600. The local storage subsystem 100 establishes continuous remote copy with the remote storage subsystem 200. The continuous remote copy synchronously or asynchronously mirrors data from the local storage subsystem 100 to the remote storage subsystem 200.

The host computers 500 each include a CPU, a memory, and an interface. The CPU reads programs stored in the memory and executes the programs. The programs include applications (AP) 503, operating system (OS), virtual machines (VM) 502, and hypervisor 501. The virtual machines may execute multiple applications and there may not be one to one correspondence between them. The host computer 600 has hypervisor 601. The hypervisor 501, 601 manages and controls the virtual machines. Each virtual machine has an independent ID for storage networking. Examples of such an ID include WWPN for FC/FCoE SAN (Storage Area Networking) or IP (Internet Protocol) address for iSCSI SAN. Each hypervisor 501, 601 also has independent ID. The hypervisor of the host computer will access i-nodes areas on the storage volumes of the corresponding storage subsystem.

The storage subsystems 100, 200 each have a storage controller that includes a CPU, a memory, storage interfaces, and disk interface. The CPU controls the storage subsystem and reads microcodes and tables from the memory. The memory stores the microcodes and tables. The microcodes and tables may include I/O control 120, 220, cache control, disk control, RAID (Redundant Array of Independent Disks) control, remote copy control 110, 210, local copy control, and the like. The I/O control 120, 220 is employed for I/O operation from the host computers (500 for 120, 600 for 220). The storage interface connects the storage subsystem 100, 200 with the corresponding host computer(s) 500, 600 via the corresponding storage network 400, 401. The disk interface connects the CPU and memory with a plurality of storage devices stored in a disk unit, which may be inside the storage subsystem or an external unit that is coupled to the storage subsystem. The storage devices may include solid-state devices, such as flash memories, and/or hard disk drives (HDD), for storing data. The local storage subsystem 100 has remote copy function 110 for source, and the remote storage subsystem 200 has remote copy function 210 for target.

The remote copy function for source 110 is stored in the memory of the local storage subsystem 100. It includes configuration interface 111, initiator filter table 112, data alignment table 113, remote initial copy control 114, and remote write data transfer control 115. Each volume stored in the storage subsystem can be selected so that the volume applies or does not apply the remote copy function, and the storage subsystem maintains such configuration information. The configuration interface 111 is an interface for the user, storage management tool, and/or hypervisor management tool to set information of remote copy object virtual machines. The initiator filter table 112 stores information of the remote copy object virtual machines. It is set from the configuration interface 111. The data alignment table 113 stores information of the stored data alignment of virtual machines 502. It is set by the I/O control 120. The remote initial copy control 114 transfers data in the volume 130 of the local storage subsystem 100 to the volume 230 of the remote storage subsystem 200. It can select a transfer object area.

The remote copy function for target 210 is stored in the memory of the remote storage subsystem 200. It can receive data from the local storage subsystem 100 with data consistency. If a failure occurs on the local storage subsystem 100, it triggers a failover process and changes the operation on the remote storage subsystem 200 instead of the local storage subsystem 100. At that time, the virtual machines which use remote copy functions boot on the host computer 600 for the remote storage subsystem 200. This is known in the art.

The local volume 130 of the local storage subsystem 100 stores data 131 (131a-e). The i-node data 131a and data 131b, 131c, 131d of virtual machines 502 work on the host computer 500. In the example shown in FIG. 1, the local copy transfers i-node data 131a, data 131b, 131e, a portion of data 131c from the local storage subsystem 100 to the remote storage subsystem 200. The remote volume 230 stores i-node data 231a, and data 231b, 231c, 231e. The data 231a, 231b, 231e in the remote storage subsystem 200 are mirror data of data 131a, 131b, 131e in the local storage subsystem 100. The virtual machine may have multiple applications running. In this case, only data related to application AP1 of data 131c would be copied to data 231c and data related to application AP0 would not be copied to data 231c despite the fact that applications AP0 and AP1 are run on the same virtual machine VM #1.

Figure 2:
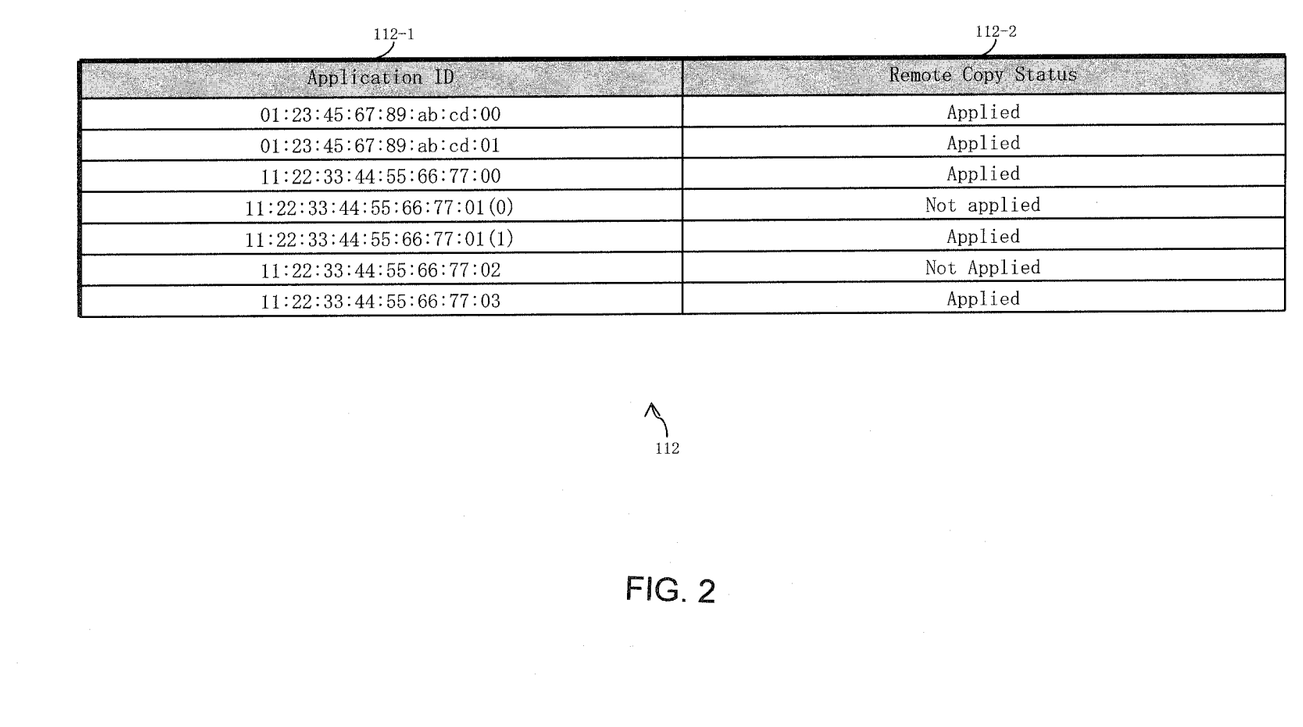
FIG. 2 illustrates an example of the initiator filter table 112 in the storage subsystem of FIG. 1.

FIG. 2 illustrates an example of the initiator filter table 112 in the storage subsystem 100 of FIG. 1. The initiator filter table 112 stores information of the remote copy object virtual machines. It includes columns of the Application ID 112-1 of the virtual machine 502 which is the WWPN in the embodiment shown and the Remote Copy Status 112-2 information on whether the virtual machine is applied or not applied. The status of "Applied" means remote copy function is applied to the virtual machine. The status of "Not applied" means remote copy function is not applied to the virtual machine.

Figure 3:
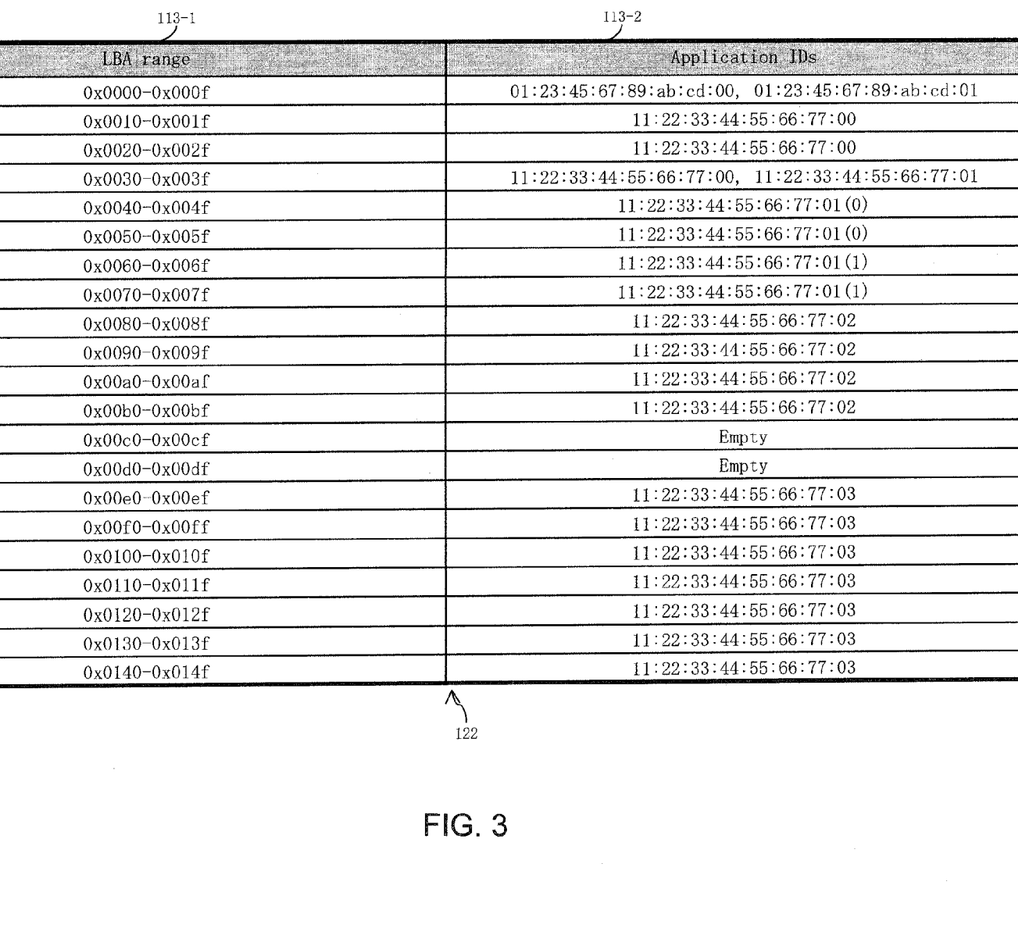
FIG. 3 illustrates an example of the data alignment table 113 in the local storage system of FIG. 1.

FIG. 3 illustrates an example of the data alignment table 113 in the local storage system 100 of FIG. 1. The data alignment table 113 stores information of the stored data alignment of virtual machines 502. It includes columns of the LBA Range 113-1 as the area of the volume and the Application IDs 113-2 as the list of the accessing IDs which are WWPNs in the embodiment shown. An entry of "Empty" in the Application IDs 113-2 means the area has not been accessed yet. The data alignment table 113 of a volume is formatted when the volume is formatted.

Figure 4:
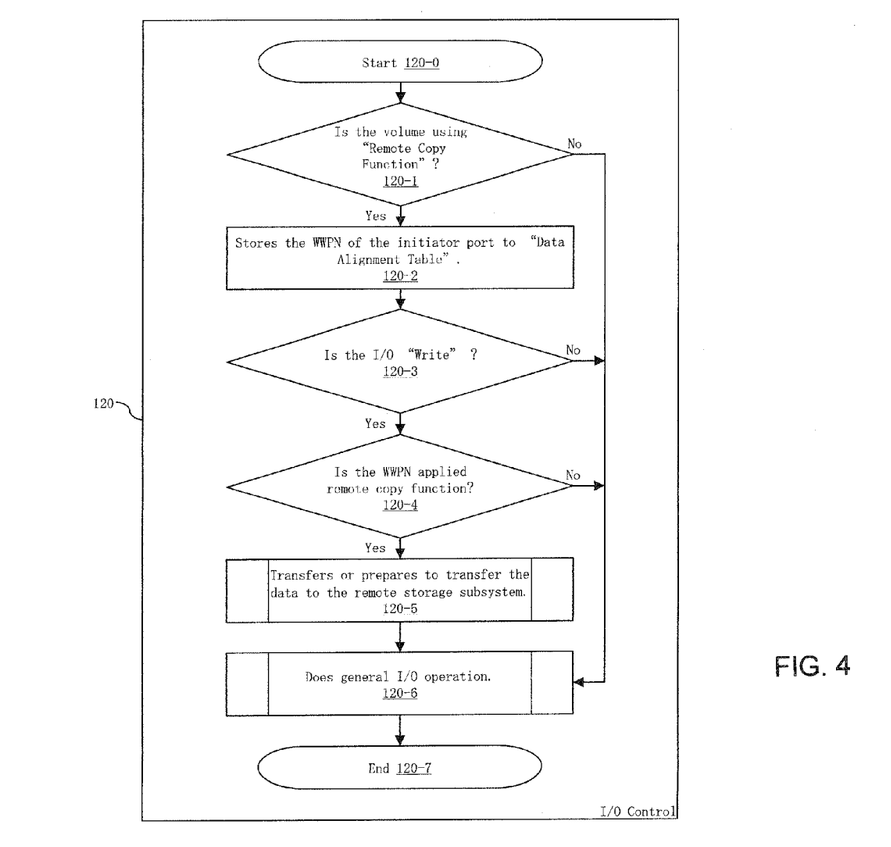
FIG. 4 illustrates an example of a process flow of I/O Control 120 in the local storage subsystem of FIG. 1.

FIG. 4 illustrates an example of a process flow of I/O Control 120 in the local storage subsystem 100 of FIG. 1. This program runs when it receives an I/O from a host computer 500. The program starts at step 120-0. In step 120-1, the program checks whether the volume uses the remote copy function or not. If yes, the program proceeds to step 120-2; if not, the program proceeds to step 120-6. In step 120-2, the program gets the WWPN of the initiator from the received I/O command in FC layer and stores the information to the data alignment table 113. The I/O command includes FCID (Fibre Channel ID). The storage subsystem 100 can get the relating WWPN to that FCID by inquiring the switch device in the network 400. In step 120-3, the program gets the attribution of the I/O command in SCSI layer and checks whether the I/O command is "Write" or not. If the command is "Write," it proceeds to step 120-4; if not, it proceeds to step 120-6. In step 120-4, the program checks whether the initiator port ID obtained in step 120-2 uses remote copy function or not by referencing the initiator filter table 112. If yes, the program proceeds to step 120-5; if not, it proceeds to step 120-6. In step 120-5, the program runs the remote copy data transfer program, which may be any suitable program known in the art. If the remote copy is synchronous remote copy, the program waits for a response from remote storage subsystem 200. If the remote copy is asynchronous, the data transfer is run later while the program prepares. In step 120-6, the program runs I/O operation program which may be any suitable program known in the art. The program ends at step 120-7.

Figure 5:
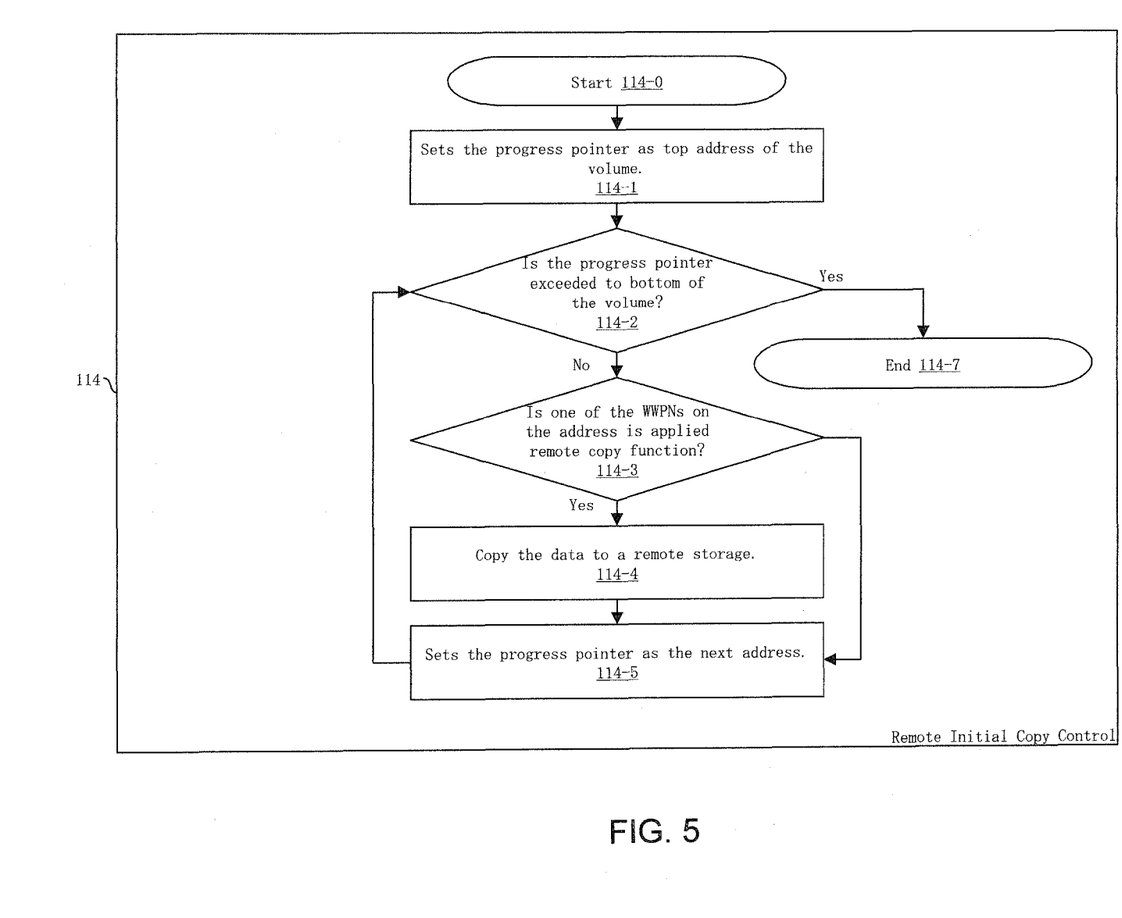
FIG. 5 illustrates an example of a process flow of Remote Initial Copy Control in the local storage subsystem of FIG. 1.

FIG. 5 illustrates an example of a process flow of Remote Initial Copy Control 114 in the local storage subsystem 100 of FIG. 1. This program runs after the remote pair is established or new active (remote copy applied) application ID/WWPN is registered to the initiator filter table 112. The program starts at step 114-0. In step 114-1, the program sets the progress pointer as the top address of the volume. In step 114-2, the program checks whether the progress pointer exceeded beyond the bottom address of the volume or not. If yes, the program ends at step 114-7; if no, it proceeds to step 114-3. In step 114-3, the program checks whether any of the WWPNs on the address at which the progress pointer points is accessed by remote copy applied virtual machines by referencing the initiator filter table 112 and data alignment table 113. If yes, the program proceeds to step 114-4; if not, it proceeds to step 114-5. In step 114-4, the program copies data in the address range from the local volume 130 to the remote volume 230. In step 114-5, the program sets the progress pointer as the next address and returns to step 114-2.

Figure 6:
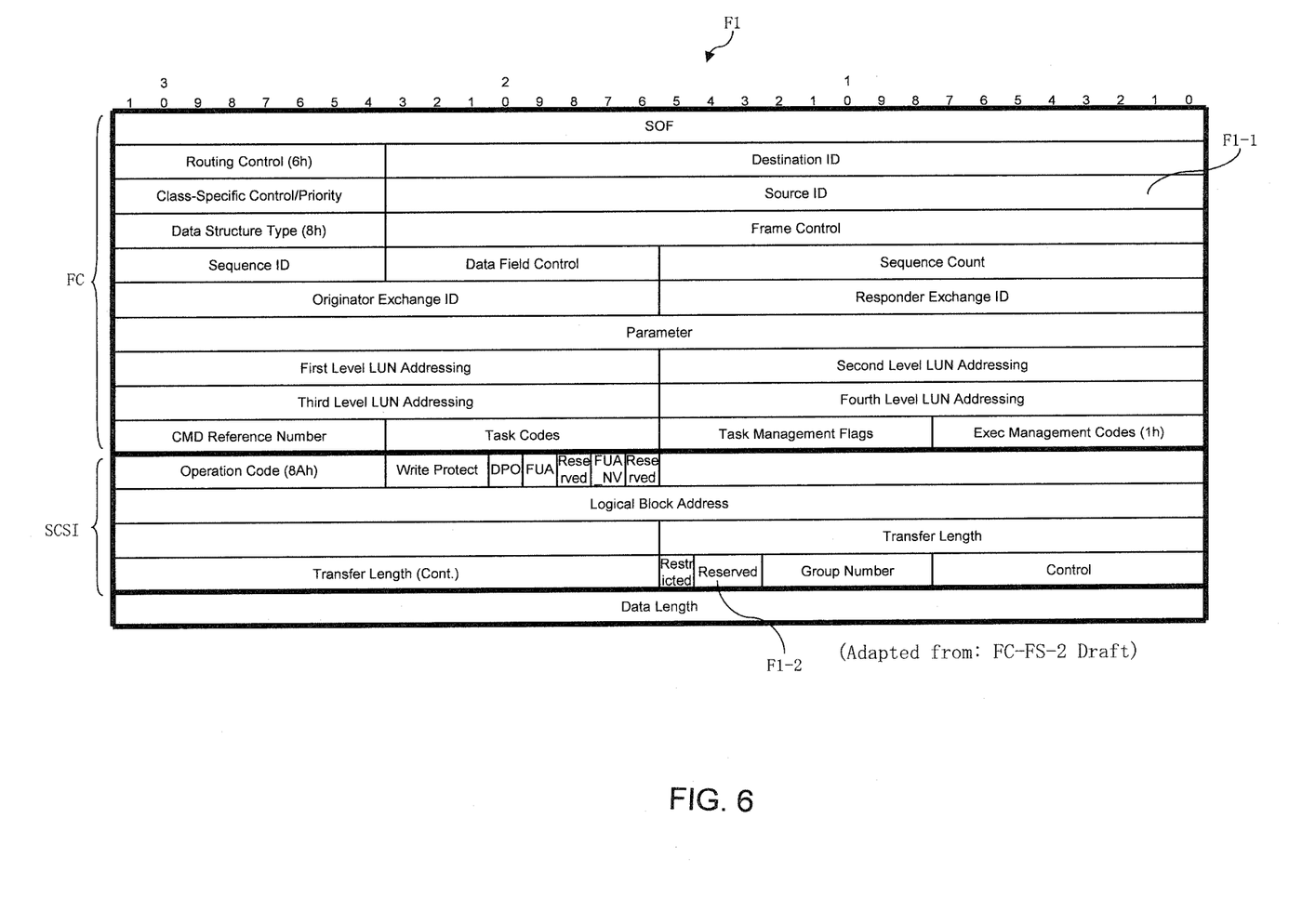
FIG. 6 illustrates an example of a write I/O frame structure from the host computer.

FIG. 6 illustrates an example of a write I/O frame structure from the host computer 500. It shows an "FC (Fibre Channel)" frame structure, in which the frame F1 is an FC frame. The Application ID F1-1 is an ID of an application that publishes the write I/O. That ID is an FCID. The storage subsystems can search the WWPN of the application with this FCID by a request to a switch device in the storage network 400. AP 503 can further store other IDs in F1-2 area to mirror data partially as explained in FIG. 1. In this case, the combination of F1-1 and F1-2 would be used to identify the ID of the application since multiple applications are executed on the same virtual machine and the identification by the virtual machine cannot be used. If the storage subsystem determines that the data is associated with application by the combination of F1-1 and F1-2, the storage subsystem would decide to mirror the data to a remote site.

Figure 7:
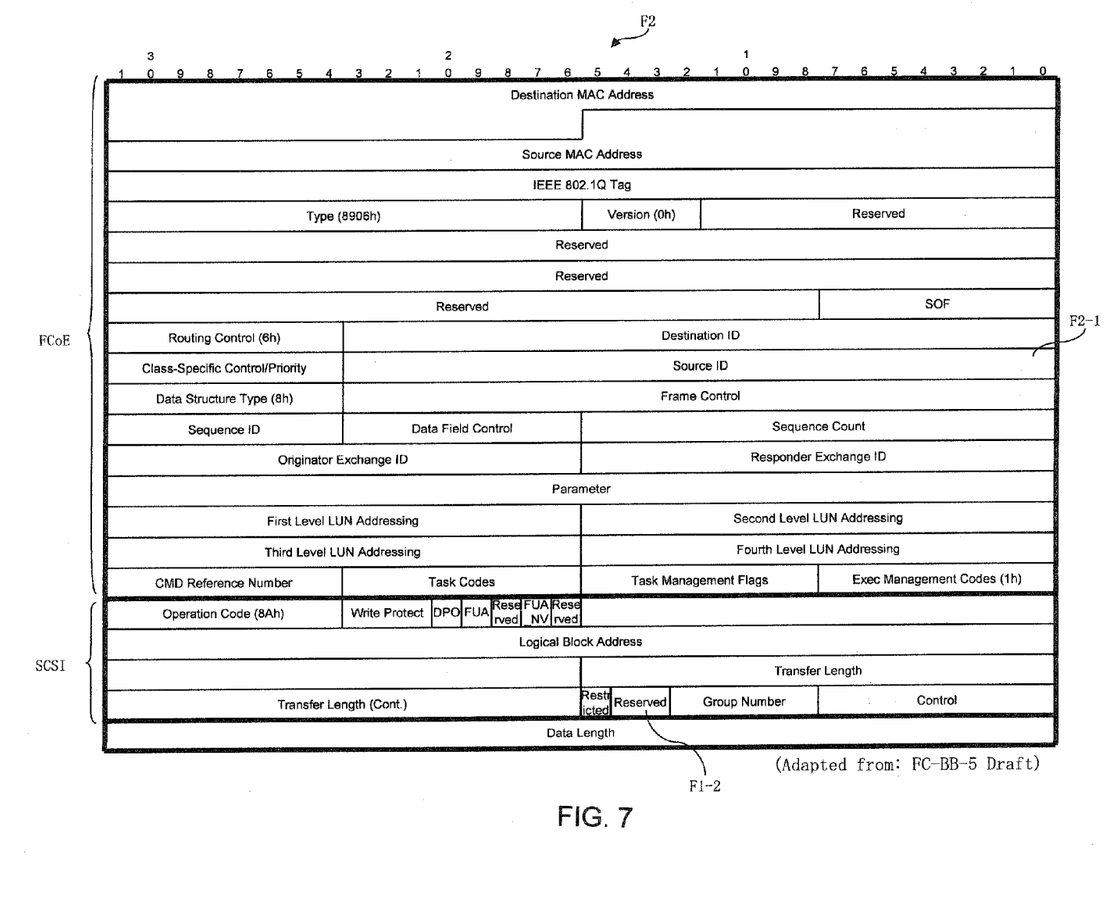
FIG. 7 illustrates another example of a write I/O frame structure from the host computer.

FIG. 7 illustrates another example of a write I/O frame structure from the host computer 500. It shows an "FCoE (Fibre Channel over Ethernet)" frame structure, in which the frame F2 is an FCoE frame. The Application ID F2-1 is an ID of an application that publishes the write I/O. That ID is an FCID. The storage subsystems can search the WWPN of the application with this FCID by a request to a switch device in the storage network 400.

Figure 8:
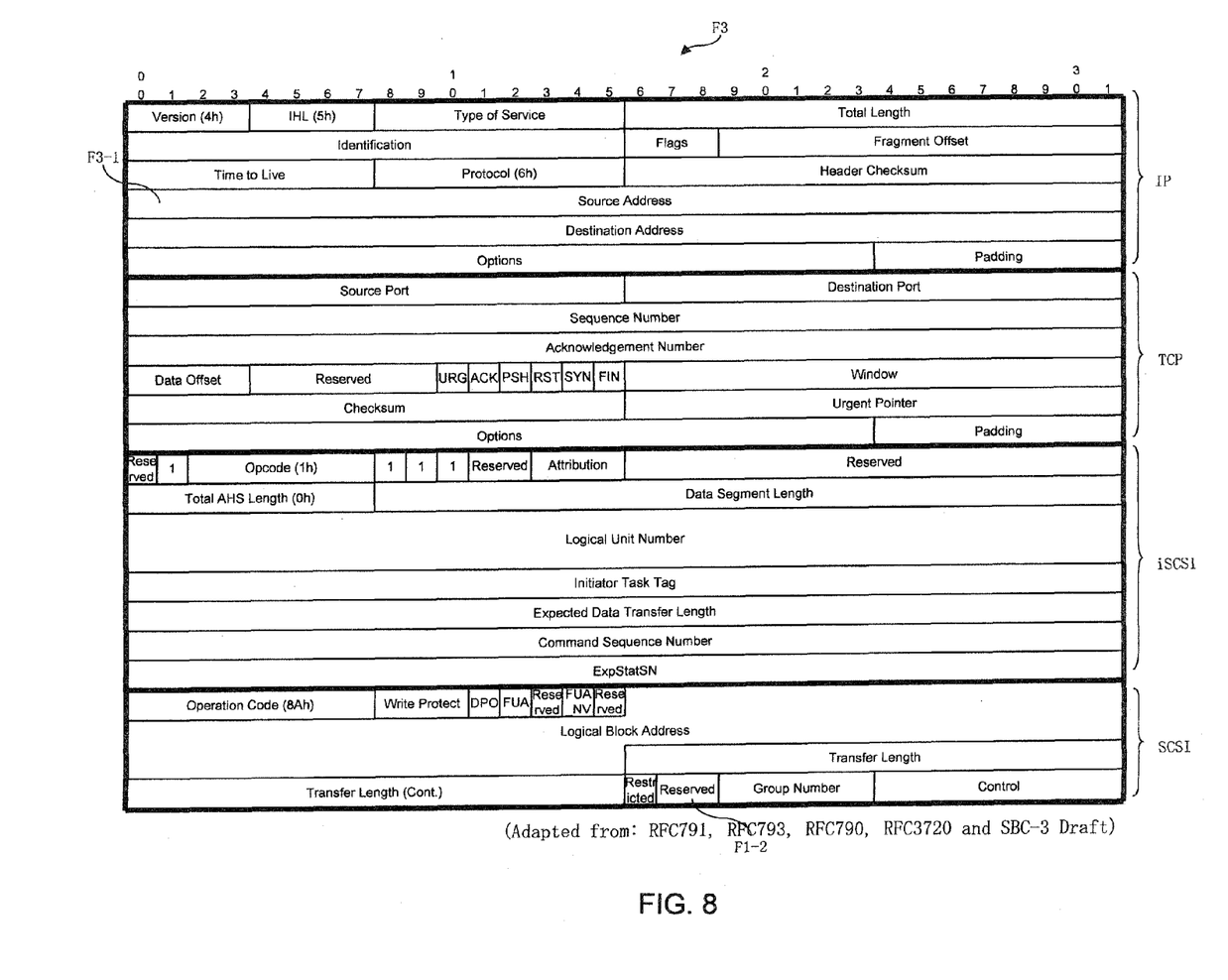
FIG. 8 illustrates yet another example of a write I/O frame structure from the host computer.

FIG. 8 illustrates yet another example of a write I/O frame structure from the host computer 500. It shows an "iSCSI" frame structure, in which the frame F3 is an iSCSI frame that includes IP, TCP, and SCSI protocol. The Application ID F3-1 is an ID of a virtual machine 502 that publishes the write I/O.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for improving the efficiency of applying a data transfer function such as remote copy to a data beyond the initial write input/output (I/O) operation of that data. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method for controlling data for a storage system which is coupled via a network to one or more host computers, the method comprising:
   receiving, by the storage system, a write input/output (I/O) command of a data from a host computer, the write I/O command including an application ID identifying an application operating on the host computer which sends the write I/O command;
   maintaining a record of a relation between the application ID in the write I/O command and a storage location of the data to be written in a first volume of the storage system;
   determining, based on the application ID included in the write I/O command and the record, whether a data transfer function between the first volume and a second storage volume is to be performed on the data of the write I/O command in addition to writing the data to the storage location in the first volume; and
   if the data transfer function is to be performed on the data, then performing the data transfer function on the data to the second volume.

2. The method according to claim 1,
   wherein in the determining, the storage location is used to determine whether the data transfer function between the first volume and a second storage volume is to be performed; and
   wherein the data transfer function includes at least one of data copy the data, data mirroring of the data, data restoration of the data, and remote copy of the data.

3. The method according to claim 1,
   wherein the application ID is one of WWPN (World Wide Port Name) of an initiator port for an initiator of the write I/O command or an IP address.

4. The method according to claim 1,
   wherein the application ID is an ID of a virtual machine on the host computer issuing the write I/O command.

5. The method according to claim 1,
   wherein maintaining a record of the relation between the application ID in the write I/O command and a storage location of the data to be written in a volume of the storage system includes maintaining a data alignment table which shows relationship between storage location and corresponding application ID and maintaining an initiator filter table which shows relationship between application ID and data transfer status, the data transfer status indicating whether a data transfer function is to be applied for the application ID.

6. The method according to claim 1, further comprising:
   identifying, based on the write I/O command, the storage location of the data to be written in the first volume,
   wherein the application ID is included in a SCSI command by the application operating on the host computer.

7. The method according to claim 1, wherein after determining that the data transfer function is to be performed on the data to the second volume, performing the data transfer function comprises:
   setting initially a progress pointer at a top address of the first volume to which the data is to be written in the storage system;
   checking the maintained record of the relation to determine whether the progress pointer currently points to an address representing a storage location which has a corresponding application ID indicating the data transfer function is to be performed, and if yes, then performing the data transfer to the second volume on the data in an address range of the address to the progress pointer currently points;
   setting the progress pointer to a next address and repeating the checking until the progress pointer reaches a bottom address of the first volume.

8. The method according to claim 1, further comprising:
   deciding whether the first volume of the storage system having the storage location of the data to be written uses the data transfer function or not; and
   performing the data transfer function on the data to the second volume only if the volume uses the data transfer function.

9. A first storage system which is coupled via a network to a second storage system and to one or more host computers in an information system, the first storage system comprising:
   a processor;
   a memory;
   an input/output (I/O) control module configured to
      receive a write I/O command of a data from a host computer, the write I/O command including an application ID identifying an application operating on the host computer which sends the write I/O command;
      maintain a record of a relation between the application ID in the write I/O command and a storage location of the data to be written in a volume of the first storage system; and
      determine, based on the application ID included in the write I/O command and the record, whether a data transfer function to the second storage system is to be performed on the data of the write I/O command in addition to write beyond writing the data to the storage location in the volume of the first storage system; and
   a data transfer control module configured, if a data transfer function is to be performed on the data, to perform the data transfer function on the data to the second storage system.

10. The first storage system according to claim 9,
    wherein the data transfer function includes at least one of data copy the data, data mirroring of the data, data restoration of the data, and remote copy of the data.

11. The first storage system according to claim 9,
    wherein the application ID is one of WWPN (World Wide Port Name) of an initiator port for an initiator of the write I/O command or an IP address.

12. The first storage system according to claim 9,
    wherein the application ID is an ID of a virtual machine on the host computer issuing the write I/O command.

13. The first storage system according to claim 9,
    wherein the storage location is used to determine whether the data transfer function to the second storage system is to be performed;
    wherein maintaining a record of the relation between the application ID in the write I/O command and a storage location of the data to be written in a volume of the first storage system includes maintaining a data alignment table which shows relationship between storage location and corresponding application ID and maintaining an initiator filter table which shows relationship between application ID and data transfer status, the data transfer status indicating whether a data transfer function is to be applied for the application ID; and
    wherein the data alignment table and the initiator filter table are stored in the memory.

14. The first storage system according to claim 9, wherein the I/O control module is configured to:
- identify, based on the write I/O command, the storage location of the data to be written in a volume of the first storage system.

15. The first storage system according to claim 9, further comprising an initial control configured, after the I/O control module determines that the data transfer function is to be performed on the data to the second storage system, to:
- set initially a progress pointer at a top address of the volume to which the data is to be written in the first storage system;
- check the maintained record of the relation to determine whether the progress pointer currently points to an address representing a storage location which has a corresponding application ID indicating the data transfer function is to be performed, and if yes, then perform the data transfer to the second storage system on the data in an address range of the address to the progress pointer currently points;
- set the progress pointer to a next address and repeat the checking until the progress pointer reaches a bottom address of the volume.

16. A non-transitory computer-readable storage medium storing a plurality of instructions for controlling a data processor to manage data transfer for a first storage system which is coupled via a network to a second storage system and to one or more host computers, the plurality of instructions comprising:
- instructions that cause the data processor to receive a write input/output (I/O) command of a data from a host computer, the write I/O command including an application ID identifying an application operating on the host computer which sends the write I/O command;
- instructions that cause the data processor to maintain a record of a relation between the application ID in the write I/O command and a storage location of the data to be written in a volume of the first storage system;
- instructions that cause the data processor to determine, based on the application ID included in the write I/O command and the record, whether a data transfer function to the second storage system is to be performed on the data of the write I/O command in addition to writing the data to the storage location in the volume of the first storage system; and
- instructions that cause the data processor, if a data transfer function is to be performed on the data, to perform the data transfer function on the data to the second storage system.

17. The non-transitory computer-readable storage medium according to claim 16,
- wherein the application ID is one of WWPN (World Wide Port Name) of an initiator port for an initiator of the write I/O command or an IP address.

18. The non-transitory computer-readable storage medium according to claim 16,
- wherein the application ID is an ID of a virtual machine on the host computer issuing the write I/O command.

19. The non-transitory computer-readable storage medium according to claim 16, wherein instructions that cause the data processor to maintain a record of the relation between the application ID in the write I/O command and a storage location of the data to be written in a volume of the first storage system include:
- instructions that cause the data processor to maintain a data alignment table which shows relationship between storage location and corresponding application ID; and
- instructions that cause the data processor to maintain an initiator filter table which shows relationship between application ID and data transfer status, the data transfer status indicating whether a data transfer function is to be applied for the application ID.

20. The non-transitory computer-readable storage medium according to claim 16, further instructions that cause the data processor, after determining that the data transfer function is to be performed on the data, to:
- set initially a progress pointer at a top address of the volume to which the data is to be written in the first storage system;
- check the maintained record of the relation to determine whether the progress pointer currently points to an address representing a storage location which has a corresponding application ID indicating the data transfer function is to be performed, and if yes, then perform the data transfer to the second storage system on the data in an address range of the address to the progress pointer currently points;
- set the progress pointer to a next address and repeat the checking until the progress pointer reaches a bottom address of the volume.

* * * * *